United States Patent [19]
Wagers et al.

[11] 3,887,887
[45] June 3, 1975

[54] ACOUSTIC BULK MODE SUPPRESSOR

[75] Inventors: Rogert S. Wagers, Richardson, Tex.; Michael J. Birch, Rothersthorpe, England; Clinton S. Hartmann; Donald F. Weirauch, both of Dallas, Tex.

[73] Assignee: Texas Instruments Incorporated, Dallas, Tex.

[22] Filed: Dec. 28, 1973

[21] Appl. No.: 429,476

[52] U.S. Cl. ................ 333/30 R; 29/25.35; 29/594; 310/9.5; 333/72
[51] Int. Cl. ...... H03h 9/30; H03h 9/32; H03h 9/26
[58] Field of Search ......... 333/72, 30 R; 310/8, 8.1, 310/9.5, 9.7, 9.8; 29/35.35, 594; 51/319

[56] References Cited

UNITED STATES PATENTS 3,564,461 2/1971 Jernigan ........................... 333/30 R
3,781,721 12/1973 Judd et al. ........................ 333/30 R

*Primary Examiner*—James W. Lawrence
*Assistant Examiner*—Marvin Nussbaum
*Attorney, Agent, or Firm*—Harold Levine; James T. Comfort; William E. Hiller

[57] ABSTRACT

An acoustic surface wave device and a method of constructing such a device which has much lower spurious responses resulting in improved operation. In a specific embodiment, the back surface of the surface wave device is treated by sand blasting or the like to form a plurality of depressions therein which act to randomly scatter undesired modes in the substrate thereby materially improving the device response.

4 Claims, 5 Drawing Figures

ACOUSTIC BULK MODE SUPPRESSOR

BACKGROUND OF THE INVENTION

This invention relates to acoustic surface wave devices in general and more particularly to an improved device and a method of making the same.

Acoustic surface wave devices are gaining widespread use as filters, delay lines and the like. In particular, in frequency ranges between 10 mhz and 1 ghz, devices which are compact and provide numerous advantages over inductive capacitive type filters and tuned electromagnetic wave guides are possible. This results directly from the fact that acoustic waves travel at a much slower speed than electromagnetic waves and thus, the size of a structure can be correspondingly smaller in the order of $10^5$.

When used in filtering applications these devices generally comprise a piezoelectric substrate on which are deposited two transducers. The most common type of transducer used is what is known as the interdigital transducer wherein a plurality of fingers extend from transducer pads on each side of the substrate and have overlapping portions. Electric fields created between the overlapping fingers of the transducer excite the piezoelectric material to generate the surface waves. In order to obtain the proper filter response, weighting of the interdigital fingers is necessary. The manner of designing such filters is described in a paper published in the IEEE Transaction on Microwave Theories and Techniques entitled "Impulse Model Design of Acoustic Surface Wave Filters" by C. S. Hartmann, D. T. Bell, Jr., and R. C. Rosenfeld, Vol. MTT-21 No. 4, April, 1973, p.p. 162–175. In the design method described therein, the impulse response is used with the desired frequency response converted into a time response through the use of Fourier transforms and the weighting then done in accordance with the time response obtained.

In acoustic surface wave devices such as filters and delay lines, the interdigital transducers in addition to producing a Rayleigh wave produce other modes which have been commonly referred in the art as bulk modes. These bulk modes result in spurious signals at the output transducers and thereby materially degrade the performance of the device. That is, they excite voltages in the output circuitry which reduce the signal to spurious response ratio of the device. In addition, band-pass side lobe levels are degraded by these modes and the ability to accurately design for prescribed band-pass responses is seriously inhibited.

Thus, it can be seen that if these modes causing the undesired electrical response at the output can be removed or decreased, improved performance is possible.

SUMMARY OF THE INVENTION

As noted above, the type of spurious signals thought to be causing these problems have been characterized in the art as propagating bulk modes. However, it has been determined that for parallelopiped substrate geometry the modes in question are not truly bulk modes but are plate modes. The plate modes of such a substrate may be described by a superposition of eight bulk modes, not all of which are purely propagating, of an infinite medium which satisfy a transverse resonance condition. In this connection, acoustic modes propagating in such a substrate must satisfy appropriate boundary conditions because of the finite size of the substrate. In order to achieve an accurate evaluation of the performance of a surface wave device employing a parallelopiped substrate, all of the modes of an infinite system corresponding to a given wave number must be included in the analysis. It is not sufficient to include only the propagating bulk modes. Eight bulk modes must be considered in order to satisfy the boundary conditions of a finite plate, including six modes corresponding to solutions to the acoustic wave equation and two modes corresponding to solutions to Poisson's equation. The nature of plate modes and transverse resonance is described more fully in the textbook "Acoustic Fields and Waves In Solids" by B. A. Auld [John Wiley and Sons, 1973]. The present invention is directed to the substantial elimination of spurious signals on a substrate in the operation of a surface wave device of which the substrates is a part, and is based on the recognition that these spurious signals are caused by plate modes. We have determined that these plate modes can be substantially reduced by scattering of the constituent partial waves which go to make up the plate wave. In order to accomplish scattering, the present invention provides for the formation of topographic deformations in the bottom surface of the substrate in a random pattern as scattering sites which act to scatter the partial waves and prevent them from contributing coherently to an output voltage. By "topographic deformations," it is intended to include either the formation of multiple indentations in the bottom surface of the substrate or the formation of multiple bumps on the bottom surface of the substrate. Further, "indentations" as employed herein is intended to refer to individual cavities or pockets and also to grooves or channels formed in the bottom surface of the substrate for the intended purpose expressed herein. It is also contemplated within the spirit of this invention to apply a coating of a suitable material to the bottom surface of the substrate, wherein the coating is provided with the topographic deformations.

The preferred method of forming these scattering sites is through the use of sand blasting of the bottom surface through a stencil having an aperture pattern therein. A fine grit abrasive much smaller in diameter than the open dimensions of the stencil is used in the sand blaster. This results in indentations in the form of depressions or cavities which have a somewhat pyramidal shape and act to provide the necessary scattering.

DETAILED DESCRIPTION OF THE PREFERRED EMBODIMENT

Figure 1:
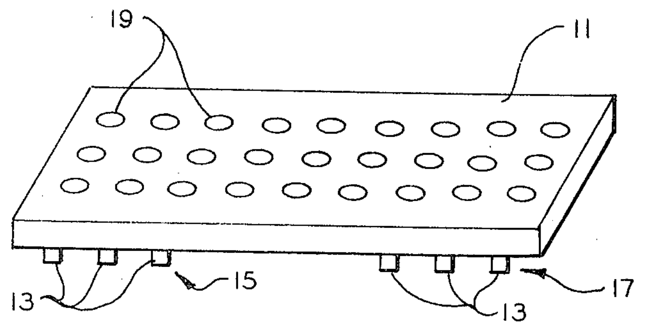
FIG. 1 is a bottom perspective view of a substrate for a surface wave device prepared in accordance with the present invention.

FIG. 1 illustrates a bottom view in perspective, of a surface wave device constructed according to the present invention. A substrate 11 of piezoelectric material will have deposited on what is normally its top surface a plurality of interdigital fingers 13. These fingers are arranged in a first group and a second group to form an input transducer 15 and an output transducer 17. The transducer 15 for example, will be excited by a voltage, which voltage will in turn induce surface waves in the substrate 11 which will then be transmitted to the pickup transducer 17 in which they will induce a voltage. In addition, to inducing the desired Rayleigh wave as an acoustic surface wave in the substrate 11, other modes commonly known as bulk modes but more accurately described as plate modes as indicated above, are induced. Typically, these plate modes are responsible for introducing spurious signals at the output transducer 17. These plate modes result from the summation of a plurality of bulk waves which act coherently reinforcing each other at the output.

In accordance with the present invention, a plurality of topographic deformations 19 as hereinbefore defined are formed on the bottom surface of the substrate 11 to provide randomly distributed scattering sites. As illustrated in FIG. 1, these topographic deformations take the form of a plurality of indentations or cavities 19 on the bottom surface of the substrate 11. These indentations act to randomly scatter the bulk partial waves which go to make up the coherent plate waves causing the interference and thus, materially reduce the amount of spurious signals received by the transducer 17. Preferably, the indentations or scattering sites 19 should be randomly spaced. However, tests have shown that regularly spaced sites still result in considerable improvement in the signal to spurious mode ratio. Typically, the scattering sites may be of a dimension on the order of magnitude of onehalf acoustic wavelength and spaced on centers of the order of magnitude of one wavelength apart. However, it will be understood that the dimensions and spacing of the scattering sites 19 may be varied over a relatively wide range without sacrificing the purpose thereof. For example, the dimension of the scattering sites could approach ten acoustic wavelengths or more depending upon the operating frequency of the surface wave device and the size of the substrate thereof. The shape of the indentations or cavities 19 can be hemispherical, pyramidal, conical, etc. Any obtainable shape or dimension will be of some benefit in reducing the amount of spurious signals present at the receiving transducer 17.

Figure 2:
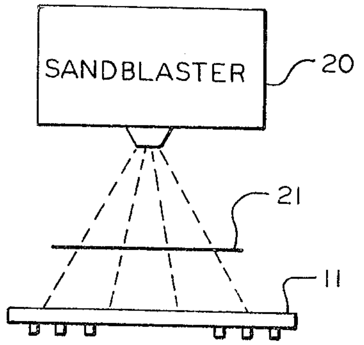
FIG. 2 illustrates a first sand blasting arrangement according to the present invention.

One method that has been found particularly suitable for making such scattering sites is illustrated by the schematic diagram of FIG. 2. As indicated therein, the substrate 11 is placed below a sand blaster 20 with its bottom surface facing the sand blaster 20 and with a screen 21 interposed therebetween. Sand blaster 20 may be a S.S. White Airbrasive Unit. The screen or mask 21 may be a stencil having an aperture pattern or a mesh screen, (typically 50–20 mesh). In general, grid spacing on the order of magniture of 1 to 3 wavelengths has been found suitable. For use as an abrasive, $Al_2O_3$ abrasive with a particle size of 27 microns or smaller for 200 mesh and equivalent sizes for other meshes may be used and ejected at high velocity from the sand blaster 20 to form hemispherical or more correctly pyramidal depressions in the bottom surface of the substrate 11. For example, with a 27 micron particle size and a 200 mesh screen, depressions 19 were etched having a radius of approximately 0.0015 inch and a center to center spacing of approximately 0.005 inch.

Figure 3:
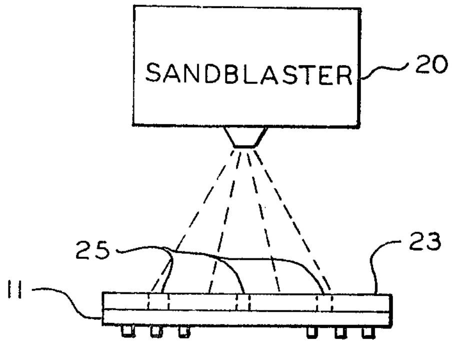
FIG. 3 illustrates a second sand blasting arrangement.

FIG. 3 illustrates another method of making the depressions 19 of FIG. 1. In this case, a protective film 23 is applied to the bottom surface of the substrate 11 and then portions of the film 23 are removed in selected places using suitable photoresist techniques, for example, to expose portions of the underlying bottom surface of the substrate 11. Thus, as illustrated in FIG. 3, the protective film 23 will have a plurality of openings 25 therein with the desired size and spacing extending through to the bottom surface of the substrate 11. Again, sand blasting may be accomplished using a sand blaster 20 as above. A further alternative involves the use of a suitable chemical etchant on the bottom surface of the substrate 11, through the holes 25 in the protective film 23 which serves as a mask for the remaining portion of the bottom surface of the substrate 11, wherein depressions or indentations 19 are etched into the bottom surface of the substrate 11.

Yet another embodiment (not shown) for providing topographic deformations in the form of channels or grooves in the bottom surface of the substrate in accordance with this invention resides in the use of ganged saw blades or the like for cutting a series of grooves or channels in the bottom surface of the substrate. Preferably, the grooves or channels extend into the body of the substrate from the bottom surface thereof a distance on the order of an acoustic wavelength. The grooves or channels may extend in one direction only, or may be criss-crossed with one set of grooves respectively intersecting with the grooves in another set.

The effectiveness of the present invention will now be illustrated by the following example:

EXAMPLE

A piezoelectric substrate of [YZ] lithium niobate was prepared with interdigital surface wave transducers thereon to provide a surface wave device. The substrate was a plate 0.02 inch thick by 0.25 inch wide by 0.75 inch long. The transducers had a shaped passband in the vicinity of 30 to 41 mhz. The substrate was sand blasted on the bottom surface thereof through a 50 mesh grid. The abrasive used was approximately 40 micron diameter alumina. The grid had approximately 50% transparency. Sand blasting was done for approximately 45 seconds to obtain a depth of depression for each of the scattering sites which was nominally 200 microns.

Figure 4:
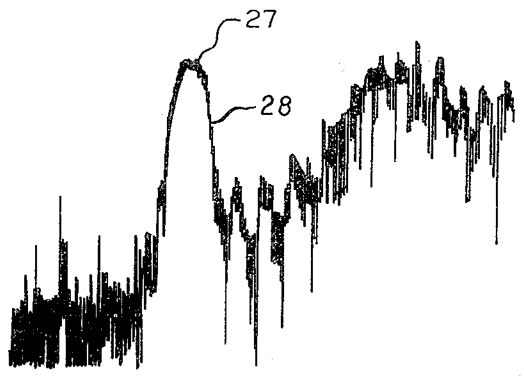
FIG. 4 illustrates the response of a filter before sand blasting.

FIG. 4 illustrates the measured transmission amplitude of the surface wave device described above before sand blasting of the bottom surface of the substrate. The vertical scale on this FIGURE and in the remaining FIGURES is 10dB/cm. As is evident from FIG. 4, spurious filter responses close to the signal 27 are only down approximately 20dB. The signal side lobes are barely detectable because of spurious responses in that area. The serration effect 28 on the right side of the main lobe due to interfering plate modes is clearly noticeable.

Figure 5:
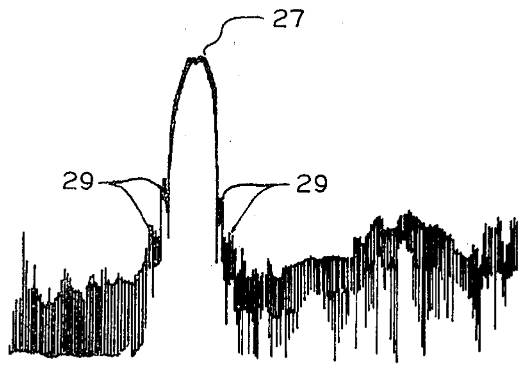
FIG. 5 illustrates the response of the same filter after sand blasting.

FIG. 5 illustrates the measured transmission amplitude for the same surface wave device after sand blasting in the manner described above. As is evident from FIG. 5, the spurious response levels are now down approximately 40 dB from the signal 27 and the side lobes 29 are now detectable. In addition, the serrations 28 on the right side have disappeared.

Thus, an acoustic surface wave device having greatly reduced spurious mode responses and a method of making such a device have been disclosed. The substrate of the surface wave device is made of any suitable piezoelectric material which may be lithium niobate ($LiNbO_3$), as in the specific example described, bismuth germanium oxide ($Bi_{12}GeO_{20}$), quartz or a piezoelectric ceramic, for instance. Although specific embodiments have been illustrated and specific steps described, it will be obvious to those skilled in the art that various modifications may be made without departing from the spirit of the invention which is intended to be limited by the appended claims.

What is claimed is:

1. An acoustic surface wave device comprising:

a substrate of piezoelectric material having a parallelepiped configuration, said substrate having a pair of major surface areas in spaced parallel relationship with respect to each other and defining top and bottom surfaces respectively thereof, at least one acoustic surface wave transducer disposed on said top surface of said substrate for generating acoustic surface waves propagating along said top surface of said substrate, and means defining a multiplicity of topographic deformations on the bottom surface of said substrate, said multiplicity of topographic deformations being spaced apart in a random pattern and having respective width dimensions on the order of magnitude of one-half acoustic wavelength of the acoustic surface waves to be generated by said at least one acoustic surface wave transducer disposed on the top surface of said substrate, and the spacing between adjacent ones of said topographic deformations being of the order of magnitude of the acoustic wavelength along the direction of propagation of acoustic surface waves to be generated by said at least one acoustic surface wave transducer disposed on the top surface of said substrate.

2. A method of treating the substrate of an acoustic surface wave device to improve its signal to spurious mode ratio, wherein the substrate is of piezoelectric material and has a parallelepiped configuration providing major surface areas in spaced parallel relationship with respect to each other and defining top and bottom surfaces respectively thereof, said method comprising:

disposing a mask having a plurality of openings therethough in registration with the bottom surface of the substrate, directing abrasive particles toward the mask from the side thereof opposite from the substrate, and forming a multiplicity of spaced topographic deformations on the bottom surface of the substrate by the impingement on the bottom surface of the substrate of abrasive particles passing through the plurality of openings in the mask.

3. A method of treating the substrate of an acoustic surface wave device to improve its signal to spurious mode ratio, wherein the substrate is of piezoelectric material and has a parallelepiped configuration providing major surface areas in spaced parallel relationship with respect to each other and defining top and bottom surfaces respectively thereof, said method comprising:

placing a stencil with an aperture pattern having a grid spacing of the order of magnitude of an acoustic wavelength relative to the acoustic surface waves to be propagated along the top surface of the substrate in spaced relation between the bottom surface of the substrate and a sand blasting apparatus, operating the sand blasting apparatus to strike the bottom surface of the substrate with abrasive particles in spaced positions thereon as determined by the grid spacing of the stencil, and forming a multiplicity of spaced topographic deformations on the bottom surface of the substrate in response to the impingement of the abrasive particles thereon.

4. A method of treating the substrate of an acoustic surface wave device to improve its signal to spurious mode ratio, wherein the substrate is of piezoelectric material and has a parallelepiped configuration providing major surface areas in spaced parallel relationship with respect to each other and defining top and bottom surfaces respectively thereof, said method comprising:

coating the bottom surface of the substrate with a protective layer, selectively forming holes through the protective layer to expose portions of the bottom surface of the substrate wherein adjacent exposed portions are spaced apart on the order of magnitude of an acoustic wavelength relative to the acoustic surface waves to be propagated along the top surface of the substrate, and etching the exposed bottom surface portions of the substrate to form a multiplicity of spaced topographic deformations on the bottom surface of the substrate.

* * * * *